United States Patent
Brei et al.

(10) Patent No.: US 11,559,957 B2
(45) Date of Patent: Jan. 24, 2023

(54) REACTIVATION OF CO-CURED FILM LAYERS

(71) Applicant: The Boeing Company, Chicago, IL (US)

(72) Inventors: Mark R. Brei, Ladson, SC (US); Kevin D. Gordon, Summerville, SC (US); Christopher Garnier, Ladson, SC (US)

(73) Assignee: THE BOEING COMPANY, Chicago, IL (US)

( * ) Notice: Subject to any disclaimer, the term of this patent is extended or adjusted under 35 U.S.C. 154(b) by 475 days.

(21) Appl. No.: 16/751,843

(22) Filed: Jan. 24, 2020

(65) Prior Publication Data

US 2021/0229378 A1    Jul. 29, 2021

(51) Int. Cl.
*B32B 41/00*     (2006.01)
*B29C 70/54*     (2006.01)
(Continued)

(52) U.S. Cl.
CPC .............. *B29C 70/54* (2013.01); *B05D 3/101* (2013.01); *B05D 5/005* (2013.01); *B32B 27/34* (2013.01); *B32B 37/12* (2013.01); *B32B 37/15* (2013.01); *B32B 38/145* (2013.01); *B64C 1/00* (2013.01); *C08J 7/02* (2013.01); *C08J 7/12* (2013.01);
(Continued)

(58) Field of Classification Search
CPC ....... B29C 70/54; B29C 66/028; B29C 70/30; B05D 3/101; B05D 5/005; B05D 7/572; B32B 27/34; B32B 37/12; B32B 37/15; B32B 38/145; B32B 2037/1253; B32B 2037/243; B32B 2038/168; B32B 2305/77; B32B 2309/02; B32B 2375/00; B64C 1/00; C08J 7/02; C08J 7/12; C08J 7/042;
(Continued)

(56) References Cited

U.S. PATENT DOCUMENTS

| 9,909,020 B2 | 3/2018 | Bateman et al. |
| 2006/0194705 A1 | 8/2006 | Staggs |

(Continued)

FOREIGN PATENT DOCUMENTS

| WO | 2006086828 A1 | 8/2006 |
| WO | 2018/158673 A1 | 9/2018 |

OTHER PUBLICATIONS

Extended European Search Report dated Jun. 22, 2021 in corresponding European Application No. 21152842.7, 8 pages.

*Primary Examiner* — Michael N Orlando
*Assistant Examiner* — Joshel Rivera
(74) *Attorney, Agent, or Firm* — MH2 Technology Law Group LLP

(57) ABSTRACT

The present disclosure is directed to a method for reactivating a co-cured film layer disposed on a composite structure, the method comprising applying a reactivation treatment composition comprising at least two solvents and a surface exchange agent comprising a metal alkoxide or chelate thereof to the co-cured film layer, and allowing the reactivation treatment composition to create a reactivated co-cured film layer, wherein the co-cured film layer was previously cured at a curing temperature greater than about 50° C. A reactivated co-cured film layer and an aircraft part having a reactivated co-cured film layer are also provided.

20 Claims, 8 Drawing Sheets

(51) Int. Cl.
- *B32B 27/34* (2006.01)
- *B32B 37/15* (2006.01)
- *B32B 38/00* (2006.01)
- *B64C 1/00* (2006.01)
- *B32B 37/12* (2006.01)
- *C08J 7/02* (2006.01)
- *C08J 7/12* (2006.01)
- *B05D 3/10* (2006.01)
- *B05D 5/00* (2006.01)
- *B29L 31/30* (2006.01)
- *B29C 65/00* (2006.01)
- *B32B 37/24* (2006.01)
- *B32B 38/16* (2006.01)
- *C08J 7/04* (2020.01)
- *B05D 7/00* (2006.01)

(52) U.S. Cl.
CPC ............ *B05D 7/572* (2013.01); *B29C 66/028* (2013.01); *B29L 2031/3076* (2013.01); *B32B 2037/1253* (2013.01); *B32B 2037/243* (2013.01); *B32B 2038/168* (2013.01); *B32B 2305/77* (2013.01); *B32B 2309/02* (2013.01); *B32B 2375/00* (2013.01); *C08J 7/042* (2013.01); *C08J 2375/04* (2013.01); *C08J 2475/04* (2013.01)

(58) Field of Classification Search
CPC ............... C08J 2375/04; C08J 2475/04; B29L 2031/3076; Y02T 50/40
USPC .................... 156/60, 64, 350, 351, 378, 379
See application file for complete search history.

(56) References Cited

U.S. PATENT DOCUMENTS

| | | |
|---|---|---|
| 2013/0004776 A1* | 1/2013 | Matsushima ........ C09D 5/4488 427/372.2 |
| 2014/0323378 A1 | 10/2014 | Li et al. |
| 2017/0368812 A1* | 12/2017 | Palmieri ............ B29C 66/0242 |
| 2018/0320004 A1 | 11/2018 | Gibson et al. |
| 2018/0345646 A1 | 12/2018 | Westren et al. |

* cited by examiner

 10 MAXIMUM 0.02 INCH TEAR LENGTH

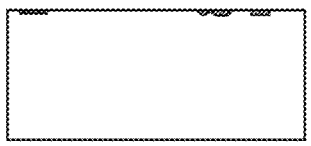 9 0.02 - 0.06 INCH MAXIMUM TEAR LENGTH AND NOT MORE THAN 1% AREA LOSS

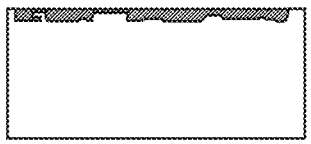 8 0.06 - 0.12 INCH MAXIMUM TEAR LENGTH AND NOT MORE THAN 5% AREA LOSS

 7 0.12 - 0.25 INCH MAXIMUM TEAR LENGTH AND NOT MORE THAN 10% AREA LOSS

 6 0.25 - 0.5 INCH MAXIMUM TEAR LENGTH AND NOT MORE THAN 25% AREA LOSS

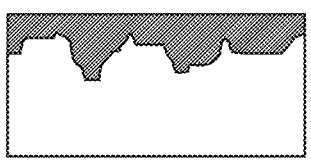 5 25 PERCENT LOSS OF COATING OR MAXIMUM 0.75 INCH LOSS LENGTH

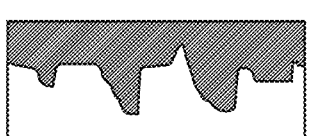 4 40 PERCENT LOSS OF COATING OR LOSS BEYOND 0.75 INCH ANY LOCATION

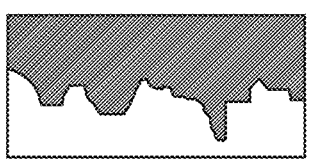 3 50 PERCENT LOSS OF COATING

 2 75 PERCENT LOSS OF COATING

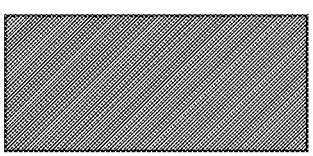 1 100 PERCENT LOSS OF COATING

FIG. 2

REACTIVATION OF CO-CURED FILM LAYERS

FIELD

The present disclosure is directed to a method for reactivating film layers that have been previously co-cured to a composite structure. A topcoat or additional paint layer may then be applied to the reactivated co-cured film layer absent any intermediate sanding step. The resulting composite structure may exhibit good adhesion of the co-cured film layer to both the composite structure and further coating layers, as well as protection from exposure to environmental conditions or elements including ultraviolet radiation, rain erosion, moisture, and/or chemicals, such as fuels. The present methods for reactivating film layers that have been co-cured to a composite structure may be particularly useful for marking aerospace components, such as aircraft components.

BACKGROUND

Many components, for example, vehicle, aerospace (e.g., aircraft and the like), and other components, are constructed of strong but light-weight composite materials that help to minimize the overall weight of the structure, e.g., an aircraft. These composite materials often comprise carbon reinforcement fibers distributed within a polymeric matrix.

Commercial aerospace and vehicle manufacturers often desire to mark or brand the aircraft or vehicles with information or indicia (e.g., model numbers, company names, company logos, or other decorational or informational markings, including words, numbers, lettering, and designs of any sort). Marking, however, has proven challenging with respect to parts made from composite materials. Painting or printing on these composite structures often causes an increase in manufacturing process times, such as paint operation flow time, thus increasing costs and time required to manufacture the part. In some cases, the part may include complex three-dimensional curvature(s), which may be difficult to print on.

In addition, maintaining desired flow characteristics over coated or painted aircraft surfaces, for example coated or painted on the wings or tail of an aircraft, may be challenging. In order to avoid impact on desired boundary layer characteristics during flight, there are allowable criteria for paint edges and waviness. There may also exist restrictions for three-dimensional surface discontinuities, such as those that may occur from inclusions caused by debris, dust, or dry coating overspray, as well as from multiple layers of applied paint, for example paint in multiple colors to create a design or distinguish lettering.

Known methods and systems exist for applying airline designs on exterior surfaces of an aircraft. For example, such known methods and systems may include building up coating or paint layers on either a primer layer or a basecoat field color layer using tape and/or masking techniques. These known methods and systems for applying airline designs on an exterior surface of an aircraft may make it difficult to meet or maintain aerodynamic performance requirements, such as requirements for coating or paint edge angles or coating or paint edge peaks that help to ensure a preferred aerodynamic performance.

Accordingly, marking processes that reduce processing time and/or expense while providing adequate color and/or designs in addition to a smooth, aerodynamic surface may be used. Such marking processes may include, for example, the use of co-curable films, such as those disclosed in U.S. Patent Publication No. 2018/0345646, incorporated by reference herein. Nonetheless, co-curable films may still present difficulties during many types of manufacturing operations. For example, typically the surface of co-cured film layers that have been previously cured to a composite structure does not permit for good adhesion of additional coating layers. Therefore, conventional treatment of co-cured films for the application of additional coating layers includes sanding in order to reactivate the surface of the co-cured film layer such that an additional layer, such as an additional paint coating or a topcoat, may be applied. Manual sanding methods, however, can be labor intensive, create ergonomic concerns, produce sanding debris, use consumables for sanding operations, and increase time in the factory. Therefore, current methods of preparing a co-cured surface for the application of an additional coating layer may lack economic and production efficiencies.

There is thus the need for the development of surface treatment of co-cured film layers to improve adhesion of additional layers to the co-cured film layer while minimizing problems of commercial viability, health, and safety.

SUMMARY

In one aspect, the present disclosure is directed to methods of reactivating a co-cured film layer on a composite structure, the method comprising applying a reactivation treatment composition comprising at least two solvents and a surface exchange agent comprising a metal alkoxide or chelate thereof to the co-cured film layer; and allowing the reactivation treatment composition to create a reactivated co-cured film layer, wherein the co-cured film layer was previously cured, for example cured to the composite structure, at a curing temperature greater than about 50° C., such as at a curing temperature of at least about 121° C. or in an autoclave.

In certain embodiments, the method further comprises applying an additional coating layer, such as a clearcoat, to the co-cured film layer. In certain embodiments, the method does not comprise sanding the co-cured film layer prior to application of the reactivation treatment composition. In certain embodiments of the methods disclosed herein, the co-cured film layer comprises polyurethane, polyimide, polyester, or epoxy upon curing, and in certain embodiments, the co-cured film layer comprises polyurethane upon curing.

In various embodiments disclosed herein, the surface exchange agent is zirconium propoxide, and in certain embodiments, the at least two solvents are dipropylene glycol dimethyl ether and n-propanol.

In certain embodiments, the method disclosed herein further comprises applying a cleaning solvent prior to or concurrently with application of the reactivation treatment composition.

In certain embodiments, the methods disclosed herein further comprise applying an additional coating layer, wherein the additional coating layer has an intercoat adhesion level ranging from 6 to 10, such as from 8 to 10, after rain erosion testing.

In another aspect, the present disclosure is directed to a reactivated co-cured film layer comprising a co-cured film layer disposed over a composite structure and a reactivation treatment composition layer comprising a surface exchange agent comprising a metal alkoxide or chelate thereof disposed over the co-cured film layer to create a reactivated co-cured film layer, wherein the co-cured film layer was cured to the composite structure at a temperature of at least about 50° C., such as at a curing temperature of at least about 121° C. or in an autoclave.

In certain aspects of the reactivated co-cured film layer disclosed herein, the co-cured film layer has not been sanded. In certain embodiments, the reactivated co-cured film layer further comprises an additional coating layer disposed over the reactivation treatment composition layer, and in certain embodiments, the additional coating layer has an intercoat adhesion level ranging from 6 to 10, such as from 8 to 10, after rain erosion testing.

In certain embodiments of the reactivated co-cured film layer, the surface exchange agent is zirconium propoxide, and in certain embodiments, the co-cured film layer comprises polyurethane, polyimide, polyester, or epoxy upon curing.

In yet another embodiment, the present disclosure is directed to an aircraft part having a co-cured film layer thereon comprising a composite structure and a reactivated co-cured film layer according to embodiments of the disclosure cured to a surface of the composite structure.

BRIEF DESCRIPTION OF THE DRAWINGS

FIG. 2 shows a visual representation relating to a scale of 1 to 10 corresponding to maximum tear length and percent area of coating removed under rain erosion testing.

Figure 1:
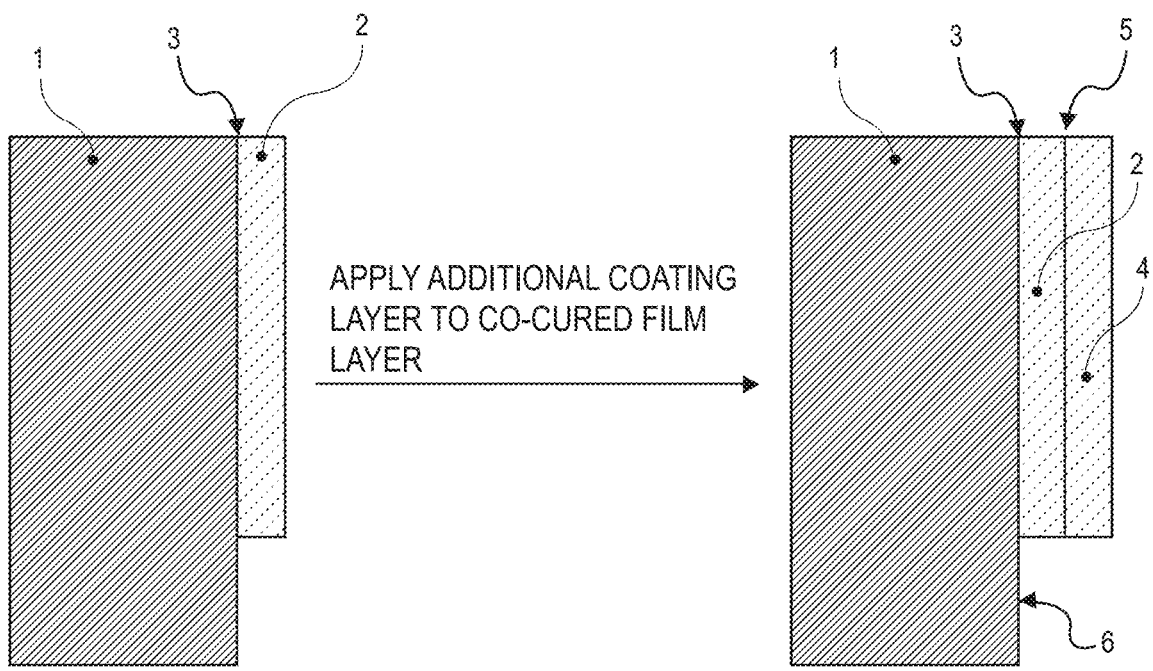
FIG. 1 is a schematic representation of a panel section of a composite structure having a co-cured film layer thereon that is treated for reactivation of its surface properties to facilitate adhering an additional coating layer onto the co-cured film layer without damaging the integrity of the co-cured film layer.

It should be noted that some details of the figures have been simplified and are drawn to facilitate understanding of the present teachings rather than to maintain strict structural accuracy, detail, and scale.

DETAILED DESCRIPTION

The following description is merely exemplary in nature and is in no way intended to limit the disclosure, its application, or uses.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls. Unless otherwise specified, all percentages and amounts expressed herein and elsewhere in the specification should be understood to refer to percentages by weight. The amounts given are based on the active weight of the material.

Disclosed herein is a method that allows for the reactivation of film layers that have been previously co-cured to a substrate or to intermediary layers cured to a substrate to improve their adhesive properties towards an additional coating layer without compromising coating integrity.

Applying an additional coating layer to a co-cured film layer has generally required a harsh surface stripping process such as mechanical abrasion (e.g., sanding) or ablation (e.g., by laser) to the co-cured film layer before an additional coating layer can be applied. Advantageously, the present disclosure provides a method that no longer requires traditional methods of mechanical abrasion of the co-cured film layer before applying a subsequent coating and/or other entities. For example, the reactivation methods as disclosed herein can reactivate the surface of the co-cured film layer to improve its adhesive properties towards additional coatings and/or other entities.

It is well-known that adhesion of coating layers may not meet in-service performance requirements for aircraft when fresh layers of a coating are applied over film layers that have been cured in an autoclave or otherwise aged. This is because, after curing or aging, co-cured film layers will have exceed the application window for adhesion of further coating layers. For co-curable film layers comprising polyurethane, for example, the curing process results in cross-linkage between the polymer units, creating rigidity in the cured, polyurethane film layer. The amount of cross-linking is proportional to the time and/or temperature at which the polyurethane film was cured. Accordingly, a co-cured film layer that has been cured in an autoclave (e.g., at a temperature of at least about 121° C.) would be expected to have a much higher cross-linking density than a comparable film layer cured by other means, such as at a lower temperature (e.g., ambient temperature or a temperature of less than 50° C.). Furthermore, one would expect that the higher the cross-linking density of the co-cured film layer, the poorer the adhesion of a subsequent coating layer would be.

Nonetheless, disclosed herein is a method for reactivating a co-cured film layer wherein the film layer has been previously cured at a high temperature, such as in an autoclave, the method comprising applying a surface reactivation treatment composition comprising a solvent and a surface reactivation agent. In the methods disclosed herein, no additional sanding step of the co-cured film layer is necessary. It is surprising and unexpected that application of a reactivation treatment composition, absent any additional sanding step, would effectively reactivate a co-cured film layer that has been cured at high temperatures, and accordingly has a high cross-linking density.

As used herein, the term "reactivation" indicates improving the adhesive properties of a coating layer, such as a co-cured film layer. Both activation and reactivation are used interchangeably herein. Adhesive properties can be measured by any means known in the art, including, for example, by a coating's intercoat adhesion level. As used herein, "intercoat adhesion level" refers to a level of adhesion between two coatings, such as a level of adhesion between a co-cured film layer and an additional paint layer disposed directly over the co-cured film layer. As disclosed herein, intercoat adhesion may be quantified on a scale of 1 to 10 based, for example, tear length and removal of the additional paint layer after exposure to rain erosion testing.

In certain aspects, the methods disclosed herein comprise applying a surface reactivation treatment composition comprising a solvent, a surface exchange agent, and optional additive(s) to the co-cured film layer, wherein the surface exchange agent is selected from metal alkoxides or chelates thereof, such as titanium or zirconium alkoxides or chelates thereof.

In certain embodiments, there is disclosed herein a method of facilitating adhesion of an additional coating layer to a co-cured film layer present on a substrate comprising applying a reactivation treatment composition comprising a solvent, a surface exchange agent, and optional additive(s) to the co-cured film layer, wherein the surface exchange agent is selected from metal alkoxides or chelates thereof, such as titanium or zirconium alkoxides or chelates thereof.

The methods disclosed herein do not require additional steps such as mechanical abrasion or chemical stripping of a co-cured film layer to improve its adhesive properties towards an additional coating layer.

As shown in FIG. 1, reactivating adhesion of a previously cured film layer (2) on a rigid substrate (1), such as an aircraft composite part, and adhering a new coating layer (4) with an effective adhesive connection (5) to the previously cured film layer (2) requires not only reactivating adhesion of the previously cured film layer (2) to the additional coating layer (4), but also requires not affecting the integrity of the original co-cured film layer's adhesive connection (3) between the substrate (1) and the previously cured film layer (2), nor affecting the integrity of any exposed (uncoated) surfaces (6) of the substrate.

Composite Structures

In the methods disclosed herein, at least one co-cured film layer is present on a substrate, having been previously cured to the substrate or to an intermediary layer at a high temperature, e.g., at a temperature greater than about 50° C., such as in an autoclave. The substrate may be a support structure, such as a panel constructed for use as a structural support section in a building, vehicle or aircraft. For example, the substrate may be a panel section of an aircraft body or wing. In one aspect, the substrate comprises or consists essentially of a composite material.

The composite materials may be carbon fiber reinforced epoxy or glass reinforced epoxy materials. The composite materials may contain glass, wood or fabric. The substrate may be a substantially inelastic or rigid plastic, which may include polyimides or polycarbonates. In one aspect, the substantially inelastic or rigid plastic does not include plastic films or plastic packaging materials that are capable of being stretched or readily manipulated, and/or does not include plastic films or plastic materials that have no structural rigidity or resilient deformability.

In some embodiments, the composite structures are formed from an organic matrix and fibers, such as an epoxy resin and Carbon Fiber Reinforced Polymer (CFRP). In some embodiments, the composite structure is in the form of a prepreg. The term "prepreg," as used herein, refers to one or more sheets or lamina of fibers that have been impregnated with a matrix material. The matrix may be present in a partially cured state to exhibit a selected stickiness or tack, for example.

In some embodiments, the prepreg layers are placed adjacent to one another. In certain embodiments, the prepreg layers within a layup may be positioned in a selected orientation with respect to one another. For example, prepreg layups may comprise prepreg layers having unidirectional fiber architectures, with the fibers oriented at 0°, 90°, a selected angle θ, and combinations thereof, with respect to the largest dimension of the layup, such as the length. It may be further understood that, in certain embodiments, prepregs having any combination of fiber architectures, such as unidirectional and multi-dimensional, may be combined to form the prepreg layup.

In some embodiments, the composite structures are formed from one or more sandwich panels (e.g., honeycomb panels), one or more of which may be composite panels. Each sandwich panel generally includes a core formed of a relatively lightweight material, sandwiched between two panel skins. Composite structures may include one or more coatings or layers applied to the underlying panels or layers of material. Composite structures may include one or more sandwich panels, joints formed between two or more sandwich panels, and/or three-dimensional structures formed using one or more sandwich panels.

As illustrative, non-exclusive examples, composite structures may be utilized in such aircraft structures as wings, fuselages, horizontal stabilizers, vertical stabilizers, and engine housings; however, other components of an aircraft additionally or alternatively may include composite structures such as sandwich panels and/or joints formed between two or more sandwich panels. Other applications in aircraft for composite structures include overhead storage bins, floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, one or more composite structures may include or be a portion of space satellites or aerospace vehicles, transit vehicles, shipping containers, shelters, large antennae or disk reflectors, refrigeration panels, rapid transit floor panels, shipboard electronic deck shelters, cargo pallets, automobile bodies, boats and other marine vehicles, architectural curtain walls, partitions, divider panels, expandable hospital shelters, and/or interior structures of an assembly.

In some embodiments, the composite structure and the co-curable film layers as disclosed herein are positioned together and co-cured in a mold, and in certain embodiments, the co-curing may result in the incorporation of the co-curable film layers onto the composite material.

Co-Cured Film Layers

As discussed above, a co-cured film layer that has been cured to the surface of a substrate, such as a composite substrate or an intermediary layer(s) between a composite structure and the co-cured film layer, develops resistance to forming strong adhesive linkages towards other entities, such as additional coating layers, after the film layer has been cured. The surface properties of the co-cured film layer may become more inert than might be predicted, based on the chemistry of their individual components and the curing conditions. Without wishing to be limited by any theory, it is believed that this phenomenon may result from a reduction in the film's surface energy and amount of reactive surface functional groups in conjunction with a higher cross-link density as a function of cure time, temperature and/or aging, which can reduce chemical interaction and/or the formation of strong adhesive linkages with other entities.

The co-cured film layers that may be reactivated according to the methods disclosed herein include, but are not limited to, fully or partially cross-linked organic film layers. In some embodiments, the co-cured film layers of the present disclosure are formed from a co-curable film composition comprising a thermosetting resin. Generally, the thermosetting resin comprises prepolymers in the form of a soft solid or viscous liquid at room temperature (about 20° C. to about 25° C.), which typically hardens after curing.

"Curing" induces chemical reactions in a curable substance, such as a co-curable film composition, resulting in extensive cross-linking between polymer chains to produce an insoluble polymer network. Curing may be performed by processes that include, for example, heating and/or exposure to ultraviolet light. In some embodiments, curing is promoted by high pressure, and/or mixing with a curing agent or catalyst. The phrase "cured" as used herein refers to subjecting a polymerizable composition to curing conditions, wherein reaction of at least a majority of the reactive groups of the composition occurs, to form a solid polymerizate. As one of skill in the art will appreciate, subjecting a polymerizable composition to curing conditions, such as an autoclave, may result in a cured composition wherein a higher percent of the reactive groups react such that the polymerizable composition is more cured than the same composition that has not been exposed to curing conditions or has been exposed to less curing, e.g., cured at a lower temperature, including ambient temperature, e.g., about 20° C. to about 25° C. or for a shorter time period.

In some embodiments, the curing comprises baking the co-curable film layer or layers and the composite structure together at a temperature greater than about 50° C., such as a temperature ranging from about 65° C. to about 200° C. or from about 121° C. to about 185° C. In some embodiments, the curing comprises baking the co-curable film layer or layers and the composite structure for a time period that is less than 48 hours, such as less than 24 hours, or a time period ranging from about 2 to about 12 hours.

In some embodiments, co-curing is accomplished by the use of an autoclave, oven curing, or out-of-the-autoclave curing. "Out-of-the-autoclave," as used herein, is a process whereby a prepreg layup including, for example, co-curable film layers of the present disclosure is within a closed mold. Vacuum, pressure, and heat are then applied using art-known means other than an autoclave, e.g., a resin transfer molding press. In certain other embodiments, co-curing is accomplished by the use of an autoclave at a temperature of at least about 121° C.

Examples of suitable thermosetting resins for use in the co-curable film compositions of the present disclosure include polyester resins, epoxy resins, and polyimide resins, e.g., bismaleimide (BMI) and/or polyetherimides. In certain embodiments, the thermosetting resins for use with the co-curable film composition of the present disclosure include at least one polyisocyanate and at least one polyol, which form polyurethane upon curing. The term "polyurethane," as used herein, refers to polymers containing urethane (also known as carbamate) linkages, urea linkages, or combinations thereof, e.g., polyurethane-ureas. Thus, polyurethanes of the disclosure may contain at least urethane linkages and, optionally, urea linkages.

In some embodiments, the co-curable film composition of the present disclosure comprises an amount of thermosetting resin ranging from about 5 to about 100 weight percent (wt. %), such as from about 15 to about 75 wt. % or from about 25 to about 60 wt. %, on the basis of the total weight of a co-curable film composition.

In some embodiments, the co-curable film composition of the present disclosure further comprises non-conductive additives, such as fillers, flow control agents, toughening agents, stabilizers (e.g., antioxidants, heat stabilizers, and ultraviolet (UV) stabilizers), curing agents and/or catalysts.

Examples of non-conductive fillers suitable for use with the co-curable film composition of the present disclosure include ground or precipitated chalks, quartz powder, alumina, dolomite, carbon fibers, glass fibers, polymeric fibers, titanium dioxide, fused silica, carbon black, calcium oxide, calcium magnesium carbonates, barite and, especially, silicate-like fillers of the aluminum magnesium calcium silicate type. Other suitable non-conductive fillers include ceramics and fumed silica. The fillers may be in the form of flakes, powders, fibers, microspheres, or glass balloons, and may be solid or hollow structures. Further discussion of fillers may be found, for example, in U.S. Pat. No. 4,980,234, which is herein incorporated by reference in its entirety.

In some embodiments, the fillers may be present in the co-curable film composition of the present disclosure in an amount ranging from about 0 wt. % to about 40 wt. %, such as from about 5 wt. % to about 30 wt. %, based on the basis of the total weight of the co-curable film composition.

Flow control agents may be employed to modify the rheological properties of the co-curable film composition. Examples of suitable flow control agents include fumed silica and metallic powders. The flow control agents may be present in an amount ranging from about 0 wt. % to about 40 wt. %, such as from about 0.1 wt. % to about 10 wt. %, on the basis of the total weight of the composition.

In some embodiments, toughening agents may be added to the co-curable film compositions to adjust the film rigidity and surface hardness of the film after curing. In certain embodiments, the toughening agents may be polymeric or oligomeric, have glass transition temperatures below about 20° C. (such as below about 0° C., below about −30° C., or below about −50° C.), and/or have functional groups such as carboxylic acid groups, amino groups and/or hydroxyl groups capable of reacting with other components of the co-curable film composition when the composition is cured by heating.

Examples of suitable toughening agents include elastomeric toughening agents, such as carboxylated nitriles (e.g., Nipol® 1472, Zeon Chemical, Inc.), carboxylterminated butadiene acrylonitrile (CTBN), carboxyl-terminated polybutadiene (CTB), poly(ether ether ketone) (PEEK) and polyetherketoneketone (PEKK). Further examples of suitable toughening agents are found, for example, in U.S. Pat. No. 4,980,234; U.S. Patent Application Publication No. 2008/0188609; and International Patent Publication No. WO 2008/087467, each of which is herein incorporated by reference in its entirety. In certain embodiments, the concentration of the toughening agents may range from about 5 wt. % to about 40 wt. %, such as from about 1 wt. % to about 30 wt. %, based on the basis of the total weight of the composition.

UV stabilizers may also, optionally, be added to the present co-curable film composition. In some embodiments, the UV stabilizers include UV absorbers, antioxidants, pigments, blocking agents, and fillers. In some embodiments, the UV stabilizers include butylated hydroxytoluene (BHT), 2-hydroxy-4-methoxy-benzophenone (UV-9), 2,4-Bis(2,4-dimethylphenyl)-6-(2-hydroxy-4-octyloxyphenyl)-1,3,5-triazine, 3,5-Di-te/t-butyl-4-hydroxybenzoic acid, n-hexadecyl ester, titanium dioxide, and carbon black. In some embodiments, the UV stabilizers may each be present in an amount ranging from about 0.1 wt. % to about 5 wt. %, such as from about 0.5 wt. % to about 3 wt. %, based on the basis of the total weight of the composition.

Examples of suitable curing agents and/or catalysts, which may be added to a co-curable film compositions disclosed herein, include aliphatic and aromatic primary amines, and aliphatic and aromatic tertiary amines. For example, amine curing agents and/or catalysts may include dicyandiamide, bisureas (e.g., 2,4-toluene bis-(dimethyl urea), 4,4'-methylene bis-(phenyl dimethylurea), and 4,4'-diaminodiphenyl sulfone (4,4-DDS). Other suitable curing agents and/or catalysts include boron trifluoride complexes, guanidines, and dicyandiamide. Additional examples of curing agents and/or catalysts may be found, for example, in U.S. Pat. No. 4,980,234 and U.S. Patent Application Publication No. 2008/0188609, each of which is herein incorporated by reference in its entirety. In certain embodiments, one or more curing agents and/or catalysts may be present in the co-curable film composition an amount ranging from about 0.1 wt. % to about 40 wt. %, such as from about 0.5 wt. % to about 10 wt. % based on the total weight of the co-curable film composition.

Other suitable additives that may optionally be included in the co-curable film composition include, for example, crosslinkers (e.g., aluminum or melamine crosslinkers), binders, corrosion inhibitors, plasticizers, and/or other conventional additives known to those of ordinary skill in the art. In some embodiments, electrically-conductive materials are also included in the present co-curable film composition as described herein.

In some embodiments, once cured to the surface of a composite structure, the co-cured film layer of the present disclosure ranges in thickness from about 1 mil to about 15 mils, such as from about 2 mils to about 10 mils, from about 3 mils to about 7 mils, or from about 3 mils to about 4 mils, wherein 1 mil is equal to approximately 25 microns.

The co-curable film layers disclosed herein may further comprise at least one colorant, such as a pigment or dye therein, or may include a colored marking material printed thereon. In certain embodiments, the at least one colored marking material is printed on the co-curable film layer, and in certain embodiments, the at least one colorant is mixed into the co-curable film composition. The at least one colorant may be used to adjust the color and appearance of the co-curable film layer. As used herein, "colorant" indicates any substance that imparts a color to the co-curable film layer and may include both colorants (as known in the art) and pigments. Suitable colorants include, for example, titanium dioxide, carbon black, black pigment, and other color dyes and pigments, including both inorganic and organic pigments. The colorant may be provided in the form of flakes, powders, fibers, or color concentrate liquid. Multiple colorants may be added to a single co-curable film. In certain embodiments, the colorant is a solvent-based or aqueous-based colorant. In certain embodiments, the colorant may impart a special effect on the co-curable film layer, such as, for example, enhanced reflectance, pearlescence, or sheen.

It will be appreciated that the co-cured film layer to be reactivated is cured on a substrate. However, there may also be various "sub" coating(s) beneath the co-cured film layer, such as other decorative coatings or co-cured film layers, primers, intermediate layers and conversion or anticorrosion coatings.

Surface Reactivation Treatment Composition

Disclosed herein is a surface reactivation treatment composition that may be applied to the surface of a co-cured film on a composite structure. As disclosed herein, the surface reactivation treatment composition may comprise at least two solvents, a surface exchange agent, and optionally one or more additional additives. According to the methods disclosed herein, the at least two solvents, surface exchange agent, and any optional additives may combined and applied to a co-cured film layer in the form of a reactivation treatment composition. The reactivation treatment compositions disclosed herein may take different physical forms, such as solutions, suspensions, mixtures, aerosols, emulsions, pastes or combinations thereof. In one aspect, the reactivation treatment composition is in the form of a solution, emulsion, or aerosol.

The reactivation treatment composition may be prepared by mixing the components together with any mixing equipment known to those skilled in the art, such as but not limited to stirrers, shakers, high speed mixers, internal mixers, inline mixers such as static mixers, extruders, mills, ultra-sound and gas dispersers or by thorough hand shaking. When the reactivation treatment composition is in the form of a solution, the solution may be prepared as a concentrate and diluted before use or prepared ready for use.

In certain embodiments, the reactivation treatment composition may be formulated as a spray formulation, and in certain embodiments, the reactivation treatment composition may be formulated so as to be painted on to the co-cured film layer. It will be appreciated that the components of the formulation can be selected to provide a particular rheology or viscosity to the formulation for particular environments such that, in use, the formulation is suitable for spray application or brush-paint application. The spray formulation may be prepared for use with particular spray guns and systems (e.g., pressures, flow rates, and nozzle diameters). The formulation may for example provide a wet film capable of drying to form a powder of about 0 microns to about 15 microns thick, such as from about 0.1 microns to about 5 microns thick, from about 0.5 microns to about 2 microns thick, or from about 0.1 microns to about 1 micron thick. The formulation may for example provide a yield of coverage ranging from about 1 $m^2/L$ to about 50 $m^2/L$, such as from about 15 $m^2/L$ to about 30 $m^2/L$.

Solvents: The reactivation treatment compositions disclosed herein comprise a solvent, which may be a single solvent or a combination of two or more solvents. In certain embodiments, the surface reactivation composition comprises at least two solvents. The at least two solvents may be chosen from organic solvents appropriate for industrial use. For example, at least two solvents may be selected from esters, ketones, ethers, and alcohols, which may provide further advantages to the reactivation treatment composition, such as in some aspects facilitating disruption of the surface of the co-cured film layer present on the substrate or by providing an effective carrier for the other components of the reactivation treatment composition, including the surface exchange agent and/or any additional optional additives. In certain embodiments, the solvents may provide a liquid formulation capable of being effectively spray applied to the surface of a co-cured film layer on a substrate, and in certain embodiments, the solvents may provide a liquid formulation capable of being effectively painted onto the surface of the co-cured film layer, such as applied with a brush. The solvents may be one or more organic solvents selected from $C_{1-12}$ alkyls having one or more (such as 1 to 4) functional groups selected from hydroxyl, ether, ketone, and ester. It will be appreciated that the alkyl group may be interrupted and/or substituted by the one or more functional groups. As used herein, "$C_{1-12}$ alkyl" refers to straight or branched chain saturated hydrocarbons having between 1 and 12 carbon atoms that may be substituted and/or interrupted by the one or more functional groups. In certain embodiments, the solvents may be one or more organic solvents selected from a $C_{3-10}$ alkyl interrupted and/or substituted as described herein.

Suitable organic solvents or solvent combinations can provide further advantages, which may depend on the surface exchange agent and any additional optional additives in the reactivation treatment composition, and may include but are not limited to: (a) ketones such as methyl ethyl ketone, methyl propyl ketone, methyl amyl ketone, methyl isoamyl ketone, methyl isobutyl ketone, acetyl acetone, and acetone; (b) alcohols such as aromatic alcohols, for example, benzyl alcohol; aliphatic alcohols, for example, $C_{1-6}$ or $C_{1-4}$ alcohols, such as tertiary butanol, n-butanol, secondary butanol, isopropyl alcohol, n-propanol, ethanol and methanol; cyclic alcohols, for example, cyclohexanol; and glycols, for example ethylene glycol, polyethylene glycol, diethylene glycol, triethylene glycol, tetraethylene glycol, propylene glycol, dipropylene glycol, tripropylene glycol and polypropylene glycol; (c) ethers such as glycol ethers, for example, glycol diethers such as the di-$C_{1-6}$ alkyl ethers of glycols including diethers of alkylene glycols, for example ethylene glycol, diethylene glycol, triethylene glycol, tetraethylene glycol, polyethylene glycol, propylene glycol, dipropylene glycol, tripropylene glycol and polypropylene glycol including but not limited to diethylene glycol dimethylether, dipropylene glycol dimethyl ether or methyl butyl ether of diethylene glycol and cyclic ethers such as tetrahydrofuran; and (d) esters such as ethyl acetate, propyl acetate, isopropyl acetate, butyl acetate, isobutyl acetate, tertiary butyl acetate and glycol ether acetates; or any combinations thereof.

In certain embodiments, at least one solvent may be selected from alcohols such as ethanol, methanol, ethoxyethanol, propanol, isopropanol or n-propanol, butanol, tertiary butanol and secondary butanol; and ether solvents such as $C_{1-6}$ alkyl ethers or combinations thereof (e.g., mixed ethers) of ethylene glycols and propylene glycols including but not limited to glyme (dimethoxyethane), diglyme, triglyme, tetraglyme and dipropylene glycol dimethyl ether and cyclic ethers, for example, tetrahydrofuran.

Solvent combinations may be provided including glycol ether:alcohol combinations such as dipropylene glycol dimethyl ether:isopropanol or n-propanol; ether:alcohol combinations such as dipropylene glycol dimethyl ether:isopropanol or n-propanol, methanol, isobutanol, secondary butanol, tertiary butanol, ethoxy ethanol and/or ethylhexanol; ethylene glycol monomethyl ether:ethanol, methanol, ethoxyethanol and/or isopropanol; glycols and monoether combinations such as dipropylenegylcol-monomethylether, dipropylenegylcol-monobutylether, and/or dipropylenegyl-col; ether combinations such as tetrahydrofuran:triglyme and tetrahydrofuran:dipropylene glycol dimethylether; solvent combinations comprising ketones such as methyl ethyl ketone, methyl amyl ketone, methyl propyl ketone. Typical solvent combinations may include high and low boiling point solvent combinations.

The solvent combination may be an ether:alcohol combination such as glycol ethers, for example glycol diethers such as diethers of alkylene glycols including dipropylene glycol diethers, for example dipropylene glycol dimethyl ether and alcohols such as aliphatic alcohols, for example $C_{1-6}$ or $C_{1-4}$ alcohols, such as isopropanol or n-propanol.

In certain embodiments, the solvents disclosed herein may contain less than about 800 ppm of water, for example less than about 700 ppm, 600 ppm, 500 ppm, 400 ppm, 300 ppm, 200 ppm, or 100 ppm water, to reduce or prevent precipitation of the surface exchange agent. In certain embodiments, the reactivation treatment compositions comprise anhydrous forms of the solvent(s). In certain embodiments, no addition of water to the reactivation treatment composition is required, and in certain embodiments, the reactivation composition is free of water.

The at least two solvents may be present in an amount (based on the total weight of the reactivation treatment composition) of less than about 99.5%, such as less than about 99%, 98%, 97%, 96%, 95%, 94%, 93%, 92%, 91%, 90%, 89%, 88%, 87%, 86%, or 85%. In certain embodiments, the at least two solvents may be present in an amount (based on the total weight of the reactivation treatment composition) of greater than about 85%, such as greater than about 86%, 87%, 88%, 89%, 90%, 91%, 92%, 93%, 94%, 95%, 96%, 97%, 98%, or 99%. In certain embodiments, the at least two solvents may be present in any amount ranging between any two of those values. For example, the at least two solvents may be present in the reactivation treatment composition in an amount ranging from about 86% to about 99.5%, such as from about 90% to about 99.5%, from about 92% to about 99%, or from about 94% to about 98%. In an aspect, the at least two solvents are present in an amount greater than about 90%, or in an amount of about 95% to about 98% based on the total weight of the reactivation treatment composition.

The reactivation treatment composition may also comprise additional solvents in addition to the at least two solvents as described above. The above at least two solvents without any additional solvent(s) may also be referred to herein as a "composition solvent." The at least two solvents may therefore comprise or consist of a "composition solvent," optionally "additional solvents," optionally incidental impurities, and optionally small amounts of water as described herein. In certain embodiments, the "additional solvent(s)" may be provided in an amount (by weight percent of the total weight of the reactivation treatment composition) that is less than about 10%, such as less than about 9%, 8%, 7%, 6%, 5%, 4%, 3%, 2%, or 1%. In an aspect, the additional solvents are the same as those selected for the composition solvent. For example, in certain embodiments, the additional solvents may be selected from at least one of acetates and alcohols, such as at least one of methoxy propyl acetate, methoxy propanol, and isopropanol.

Surface exchange agents: In addition to at least two solvents, the reactivation treatment compositions disclosed herein further comprise at least one surface exchange agent. Suitable surface exchange agents include those that facilitate surface exchange of the co-cured film layer. Suitable surface exchange agents that facilitate surface exchange may include transesterification agents. Exemplary transesterification agents may be selected from titanates and zirconates or chelates thereof, such as $C_{1-10}$ alkyl titanates, $C_{1-10}$ alkyltitanate chelates, $C_{1-10}$ alkyl zirconates, and $C_{1-10}$ alkyl zirconate chelates. Specific examples may include tetra-isopropyltitanate, tetra-n-propyltitanate, tetra-n-butyltitanate, tetra-2-ethylhexyltitanate, tetraethyltitanate, tetra-n-propylzirconate, tetra-n-butylzirconate, and combinations thereof. In certain embodiments, the at least one surface exchange agent is selected from at least one of tetra-n-propylzirconate, tetra-n-butylzirconate, zirconium-n-propoxide, tetra-n-propyltitanate, tetra-isopropyl alcohol, and tetra-n-butyltitanate.

The at least one surface exchange agent may be present in the reactivation treatment composition in an amount (based on the total weight of the reactivation treatment composition) of greater than about 0.001%, such as greater than about 0.01%, 0.05%, 0.1%, 0.5%, 1%, 2%, 3%, 4%, 5%, 6%, 7%, 8%, 9%, or 10%. In certain embodiments, the at least one surface exchange agent may be present in an amount (based on the total weight of the reactivation treatment composition) of less than about 10%, such as less than about 9%, 8%, 7%, 6%, 5%, 4%, 3%, 2%, 1%, 0.5%, 0.1%, 0.05%, or 0.01%. In certain embodiments, the at least one surface exchange agent may be present in an amount (based on the total weight of the reactivation treatment composition) ranging between any two of those values. For example, the at least one surface exchange agent may be present in an amount ranging from 0.05% to about 10%, such as from about 1% to about 8%, or from about 2% to about 6%. In one aspect, the at least one surface exchange agent is present in an amount (based on the total weight of the reactivation treatment composition) ranging from about 1% to about 8%.

Optional additives: The reactivation treatment compositions disclosed herein may contain at least one optional additive, for example to modify the drying time or to reduce corrosion. Such additives include but are not limited to anticorrosion additives and colorants such as dyes and pigments. The at least one optional additive may be a colorant such as a dye, for example a UV fluorescent dye to indicate where the reactivation treatment composition has been sprayed or painted on.

In certain embodiments, the at least one optional additive in the reactivation treatment composition disclosed herein may comprise nanoparticles. As used herein, the term "nanoparticles" means particles having a particle size of less than about 500 nm, such as less than about 450 nm, 400 nm, 350 nm, 300 nm, 250 nm, 200 nm, 150 nm, 100 nm, 90 nm, 80 nm, 70 nm, 60 nm, 50 nm, 40 nm, 30 nm, 20 nm, 10 nm, or 5 nm. The nanoparticles may be organic or inorganic nanoparticles. Examples of organic nanoparticles include carbon-based nanoparticles such as carbon black. Examples of inorganic nanoparticles include metal oxides of aluminum, zirconium, silicon, antimony, cerium, gadolinium, cobalt indium, molybdenum, neodymium, tellurium, yttrium, europium, barium, copper, lithium, titanium, tungsten, carbides such as silicon carbide, sulphates such as $BaSO_4$, carbonates such as $CaCO_3$, phosphates such as $Ca_3(PO_4)_2$ and $FePO_4$, BiOCl, and Yttria-stabilized zirconia.

It will be appreciated that all the additives as described below are optional and may be added to further enhance application of the reactivation treatment composition or to further enhance performance characteristics of the completed coating system. Suitable additives may include, for example, (a) rheology modifiers such as hydroxypropyl methyl cellulose (e.g., Methocel® 311), modified urea (e.g., Byk® 411, Byk® 410), cellulose acetate butyrates (e.g., Eastman CAB-551-0.01, CAB-381-0.5, CAB-381-20), and polyhydroxycarboxylic acid amides (e.g., Byk® 405); (b) wetting agents such as fluorochemical surfactants (e.g., 3M Fluorad®); (c) surfactants such as fatty acid derivatives (e.g., AkzoNobel®, Bermadol SPS 2543), quaternary ammonium salts, ionic surfactants, and non-ionic surfactants; (d) dispersants such as non-ionic surfactants based on primary alcohols (e.g., Merpol 4481, DuPont) and alkylphenol-formaldehyde-bisulfide condensates (e.g., Clariant® Dispersogen® 1494); (e) anti-foaming agents; (f) levelling agents such as fluorocarbon-modified polymers (e.g., EFKA® 3777); (g) pigments, such as those used in aerospace paint compositions, which may include organic phthalocyanine, quinaridone, diketopyrrolopyrrole (DPP), and diarylide derivatives and inorganic oxide pigments (for example to enhance visibility of the reactivation treatment composition and where it has been applied); (h) dyes including organic and inorganic dyes such as fluorescents (Royale Pigment and Chemicals) (e.g., to enhance visibility of the reactivation treatment composition and where it has been applied), fluorescein, and phthalocyanines; and (i) anti-corrosion additives such as phosphate esters (e.g., ADD APT, Anticor® C6), alkylammonium salt of (2-benzothiazolythio) succinic acid (e.g., Irgacor® 153), triazine dithiols, and thiadiazoles.

In certain embodiments disclosed herein, the at least one optional additive does not comprise or consist of silanes and siloxanes such that, in certain embodiments, the reactivation treatment composition does not comprise silanes or siloxanes.

Where at least one optional additive is present in the reactivation treatment composition, the at least one optional additive may be present in an amount of less than about 10% based on the total weight of the reactivation treatment composition. For example, the total amount of all optional additives combined, if present, may be provided in an amount of less than about 10%, such as less than about 9%, 8%, 7%, 6%, 5%, 4%, 3%, 2%, 1%, 0.5%, 0.1%, or 0.05%. In certain embodiments, the total amount of all optional additives combined, if present, may be provided in an amount of greater than about 0.01%, such as greater than about 0.05%, 0.1%, 0.5%, 1%, 2%, 3%, 4%, 5%, 6%, 7%, 8%, or 9%. In certain embodiments, the total amount of all optional additives combined, if present, may be provided in an amount ranging between any two of the above values, for example an amount ranging from about 0.01% to about 10%, such as from about 0.05% to about 5%, from about 0.1% to about 3%, or from about 0.5% to about 2%.

Additional Coating Layer

According to the reactivation treatment methods disclosed herein, at least one additional coating layer may be applied to the co-cured film layer on the substrate after application of the reactivation treatment composition. As used herein, the phrase "additional coating layer" is used in its broadest sense and describes decorative topcoats; undercoats; intermediate coatings; primers; sealers; lacquers; coatings that are pigmented or clear (e.g., clearcoats); coatings designed for specific purposes, such as, corrosion prevention, temperature resistance, or camouflage; coatings that are high gloss, matte, textured, or smooth in finish; and/or coatings containing specialty additives, such as metal, mica, or glass flakes. In certain embodiments, the at least one additional coating layer may be a clearcoat or a transparent coat.

In some embodiments, the at least one additional coating layer applied according to the reactivation treatment methods disclosed herein to a co-cured film layer may mitigate the effects of environmental conditions, such as chemicals or solar radiation, e.g., ultraviolet (UV) radiation, as compared to an additional coating layer applied through traditional reactivation methods, such as sanding of the co-cured film layer. For example, a surface of a composite structure may be exposed to certain environmental conditions, e.g., solar radiation, which may result in degradation of the composite structure. The additional coating layers applied according to the reactivation methods disclosed herein, however, may exhibit enhanced resistance to such environmental conditions when compared to additional coating layers applied without the application of the reactivation treatment composition as disclosed herein. In some exemplary embodiments, a composite structure comprising a co-cured film layer and at least one additional layer applied thereto according to the reactivation methods disclosed herein has a UV resistance ranging, for example, from about 200 nanometers to about 800 nanometers, such as from about 200 nanometers to about 400 nanometers.

In certain embodiments, the at least one additional coating layer applied according to the reactivation treatment methods disclosed herein to a co-cured film layer may exhibit enhanced adhesion to the co-cured film layer, as compared to an additional coating layer applied through traditional reactivation methods, such as sanding of the co-cured film layer. As will be discussed in more detail below, adhesion of the at least one additional coating layer to the co-cured film layer (e.g., intercoat adhesion) may be measured by any means known in the art.

Surface Reactivation Treatment Methods

The reactivation treatment methods of the present disclosure involve applying a reactivation treatment composition, or individual components of a reactivation treatment composition, to a surface of a co-cured film layer that has been previously cured to a substrate or to intermediary layers cured to a substrate. For example, the reactivation treatment methods disclosed herein may be used where the co-cured film layer has been previously adhered to a substrate and aged or cured beyond its application window for adhering further coatings or other entities without the need for specific reactivation of adhesion (e.g., harsh surface treatments such as mechanical abrasion).

It will be appreciated that the above-mentioned application window provides an environmental duration such that any freshly applied film layer is aged or cured past its acceptable adhesion window for applying any further coatings such that its adhesion would not meet in-service performance requirements, for example a duration of time following curing of the co-cured film layer present on the substrate such that adherence of a further coating would be unsatisfactory for performance requirements. While not wishing to be bound by theory, it is believed that application of the reactivation treatment composition to the surface of the co-cured film layer may allow for a degree of swelling of the co-cured film layer, causing an entangled network of polymer chains in the co-cured film layer to expand. This swelling of the co-cured film layer may allow spaces for the polymers in a freshly-applied additional coating layer to fit into. Furthermore, and not intending to be bound by theory, the reactivation treatment composition in the methods disclosed herein may serve to reactivate the co-cured film layer by providing a chemical "bridge" between reactive sites on a freshly-applied additional coating layer and reactive sites on the co-cured film layer.

In certain embodiments, the co-cured film layer has been previously cured at a high temperature. For example, in certain embodiments, the co-cured film layer has been previously cured at a temperature greater than about 50° C., such as at least about 65° C., about 100° C., at least about 121° C., at least about 150° C., at least about 175° C., at least about 185° C., or at least about 200° C. In certain embodiments, the co-cured film layer has been previously cured at a temperature ranging from about 65° C. to about 200° C., such as from about 100° C. to about 185° C. or from about 121° C. to about 175° F. In further embodiments, the co-cured film layer has been previously cured for a time period of less than about 48 hours, such as less than about 24 hours, about 12 hours, about 8 hours, or at least about 2 hours. In certain embodiments, the co-cured film layer has been previously cured for a time period ranging from about 2 hours to about 24 hours, such as from about 2 hours to about 12 hours or from about 2 hours to about 4 hours. In still further embodiments, the co-cured film layer has been previously cured at a temperature ranging from about 65° C. to about 200° C., such as from about 100° C. to about 185° C. or from about 121° C. to about 175° C., and for a time period ranging from about 2 hours to about 24 hours, such as from about 2 hours to about 12 hours or from about 2 hours to about 4 hours. In certain embodiments, the co-cured film layer has been previously cured at a temperature of greater than 50° C. In certain embodiments, the co-cured film layer has been previous cured in an autoclave at a temperature of about 185° F. for a time period of about 2 hours to 12 hours.

The co-cured film layer already present on a substrate can be a post-cured, aged and/or in-service coating. An in-service coating will be understood to be a coating that has been previously applied and cured and is suitable for in-service use or has actually been used in service, for example an aerospace panel that has been provided on an aircraft where the aircraft has been flown at least once. The application window may depend on the type of co-cured film layer and/or type of substrate, and may involve considerations of time, humidity, temperature, pressure, type of UV exposure, or other factors related to the curing process, for example.

It is to be understood that the reactivation treatment methods of the present disclosure are chemical methods of modifying the surface of the co-cured film layer so that the surface is more receptive to forming adhesive interactions with further coatings. Without wishing to be limited by any theory, it is believed that the interaction of the solvents and surface exchange agent with the co-cured film layer modifies the coating surface chemistry and/or surface topography to enable it to be more receptive towards other entities, including but not limited to at least one additional coating layer. The solvents, surface exchange agent, and optional additives may be chosen such that the bulk integrity of the co-cured film layer and any underlying coating(s) and substrate structures are maintained, and can further include consideration of compatibility with the substrate in case of any incidental exposure of any uncoated substrate surface to the reactivation treatment composition.

The reactivation treatment composition, or one or more of the components thereof, may be applied via any liquid application method known to those skilled in the art, such as spray, brush, dip, knife, blade, hose, roller, wipe, curtain, flood, flow, mist, pipette, aerosol, and combinations thereof. In one aspect, the application is by spray, for example the reactivation treatment may be a reactivation treatment composition formulated for use as a spray.

The method of reactivation as presently disclosed herein may be conducted at ambient temperatures, for example temperatures ranging from about 10° C. to about 35° C., such as from about 15° C. to about 30° C., or from about 20° C. to about 25° C. The method of reactivation may also be conducted generally around typical atmospheric pressures (e.g., between about 90 kPa to about 105 kPa, such as at about 101 kPa). The curing of the subsequently-applied additional coating may also occur at ambient temperature, such as from about 10° C. to 35° C. Alternatively, the curing of the subsequently-applied additional coating layer or layers may occur at elevated temperatures, such as the conditions disclosed herein that may be used for curing the co-cured film layer (e.g., an autoclave). In certain embodiments, application of the reactivation treatment composition does not require pre-heating of the co-cured film layer and substrate.

The reactivation treatment composition, or one or more components thereof, may be applied to small or large areas, to sections of larger parts or components, or to a full infrastructure such as an infrastructure associated with the aerospace (e.g., aircraft), automotive (e.g., vehicles), marine (e.g., ships), transportation (e.g., trains), military (e.g., helicopter, missile) or construction industries (e.g., buildings, floors). The surface to which the reactivation treatment composition is applied may have simple or complex geometry, including a two-dimensional or a three-dimensional geometry. The reactivation treatment composition may be applied once or multiple times prior to interaction with the additional coating layer or layers. The exposure time of the reactivation treatment composition on the co-cured film layer is not particularly limited, and such exposure time may be short, for example about five minutes, about 10 minutes, or about 15 minutes, or longer, for example about 12 hours, about 18 hours, or about 24 hours, without detriment to the integrity of the outermost co-cured film layer, any underlying co-cured film layers or coating structures, and the substrate. In one aspect, the exposure time should be sufficient to allow for evaporation of the solvents in the reactivation treatment composition to evaporate wholly or partially and the surface of the co-cured film layer to be visually dry. This may depend, for example, on airflow and the temperature of the environment wherein the reactivation treatment composition is applied. It will also be appreciated that as the relative humidity approaches 100%, the application window for applying a further coating may be reduced.

After the co-cured film layer has been reactivated, the additional coating layer or layers may be applied either immediately or after a certain amount of time, providing the reactivated surface of the co-cured film layer remains predominantly uncontaminated. The additional coating layer may include entities such as adhesives, sealants, pinhole fillers, stencils, signboards, pressure sensitive decals, and logos.

Any suitable method known to those skilled in the art may be used to assess whether the quality of adhesion between either the reactivated co-cured film layer and the additional coating layer or between the reactivated co-cured film layer and the substrate (or any coating there between) is fit for its intended purpose. Such tests include but are not limited to ASTM, ISO, or SAE (ASTM G-73) standards, in-house test methods to simulate in-service performance, in-service performance itself, and either actual or accelerated durability testing.

In the case of aerospace coatings, test methods based on water impact, such as the whirling arm rain erosion and the Single Impact Jet Apparatus (SUA) (M IJA Limited, Cambridge, UK) at an immersion time from 16 to 24 hours may be used. In certain embodiments, the whirling arm rain erosion test, which simulates the effect of rain erosion observed on commercial airplanes, may be used to assess intercoat adhesion for aerospace coatings. In these cases, the degree of overcoat removal is related to the level of intercoat adhesion, wherein a higher degree of overcoat that is removal corresponds to a lower degree of intercoat adhesion and wherein the overcoat is any additional coating layer applied on top of the reactivated co-cured film layer. These methods are described, for example, in the reference, Berry D. H. and Seebergh J. E., "Adhesion Test Measurement Comparison for Exterior Decorative Aerospace Coatings: Two Case Studies," Proceedings 26th Annual Adhesion Society Meeting, Myrtle Beach, S.C., pp. 228-230 (2003).

In certain embodiments, for rain erosion testing, a percent area removal or the longest tear length of an overcoat after exposure to a simulated rain field for 30 minutes can be used to determine the degree of intercoat adhesion between an overcoat and underlying coating, such as an additional coating layer that has been applied to a reactivated co-cured film layer according to the methods disclosed herein. This intercoat adhesion can be quantified by image analysis, including visual inspection or measurement. FIG. 2 highlights visual representations relating to a scale of 1 to 10 corresponding to maximum tear length and percent area of coating removed under a rain erosion testing as described above. For example, in FIG. 2, a level 10 intercoat adhesion value corresponds to a maximum 0.02 inch tear length, a level 9 intercoat adhesion value corresponds to a 0.02 to 0.06 inch maximum tear length and not more than 1% area loss, and a level 8 intercoat adhesion value corresponds to a 0.06 to 0.12 inch maximum tear length and not more than 5% area loss. Similarly, a level 7 intercoat adhesion value corresponds to a 0.12 to 0.25 inch maximum tear length and not more than 10% area loss, a level 6 intercoat adhesion value is equivalent to a 0.25 to 0.5 inch maximum tear length and not more than 25% area loss, and a level 5 intercoat adhesion value represents a 25% loss of coating or a maximum 0.75 inch loss length. A level 4 intercoat adhesion value corresponds to a 40% loss of coating or loss beyond 0.75 inches in any location, and a level 3 intercoat adhesion value corresponds to a 50% loss of coating. Finally, a level 2 intercoat adhesion value corresponds to a 75% less of coating, and a level 1 intercoat adhesion value corresponds to a 100% loss of coating. Depending on various factors including the types of coatings used, the methods of the present disclosure may provide an additional coating layer applied to a reactivated co-cured film layer, wherein the additional coating layer has an intercoat adhesion value corresponding, for example, to a level 10, 9, 8, 7, 6, 5, 4, 3, or 2 intercoat adhesion value. In one aspect, the scale rating is at least 7, such as at least 8, or at least 9. Depending on various factors including the types of coatings used, the methods of the present disclosure may provide a rain erosion testing value corresponding to the % area removed of about 0%, such as less than about 1%, 2%, 3%, 4%, 5%, 6%, 7%, 8%, 9%, 10%, 15%, 20%, 25%, 30%, 40%, 50%, 60%, 70%, 75%, 80%, or 90%, or any range therebetween. Further, methods of the present disclosure may provide a rain erosion testing value corresponding to a tear length that is less than about 1 inch tear length, such as less than about 0.5 inch tear length, less than about 0.25 inch tear length, less than about 0.12 inch tear length, less than about 0.06 inch tear length, or about 0.02 inch tear length. It will be appreciated that the more overcoat that is removed corresponds to inferior intercoat adhesion.

In certain embodiments, Single Impact Jet Apparatus (SUA, Cambridge) testing may be performed, for example, with equipment configured using a 0.8 mm nozzle and .22 calibre 5.5 mm Crosman Accupell Pointed Pellets (#11246). Testing can involve immersion in water for about 16 to 18 hours and using a 45° specimen to impact droplet geometry. A single water jet can be used with impact velocity of about 600+25 m/s.

In certain embodiments, rain erosion testing can use a whirling arm rain erosion apparatus employing a 1.32 m (52 inch) zero lift helicopter like propeller run at 3600 rpm. Overcoats (e.g., additional coating layer or layers applied to a reactivated co-cured film layer) can be applied at 80 to 120 microns of paint thickness with masking to produce a leading edge. A velocity of about 170 ms$^{-1}$ can be provided at the midpoint of a testing sample. An effective rain field density can be about 2 mm droplets corresponding to about 2.54×10$^{-5}$ kmh$^{-1}$ (1 inch per hour). In certain embodiments, the impact of rain erosion may be determined after 30 minutes testing, and the intercoat adhesion of the samples evaluated according to the amount of coating removed or tear lengths as described above.

The adhesive linkage between the co-cured film layer and the substrate (or any layer there between) or the adhesive linkage between the co-cured film layer and the additional coating layer, may also be determined by any other methods known in the art, such as a wet and dry cross-hatch scribe test. Dry adhesion of the coatings may be determined, for example, according to ASTM D3359, Standard Test Methods for Measuring Adhesion by Tape Test, Test method B. In certain embodiments, a crosshatch pattern can be scribed through each coating composition down to the substrate. A strip of tape, such as 1 inch wide masking tape known as 3M® type 250, can then be applied. The tape can be pressed down using two passes of a roller, such as 4.5-pound rubber covered roller. The tape can then be removed in one abrupt motion, perpendicular to the panel. The adhesion can then be rated by a visual examination of the paint at the crosshatch area to determine a percent area of removal of the coating as described above.

For aerospace applications, the reactivation methods of the present disclosure may offer advantages of improved flow time for the process of reactivation, as well as greater reproducibility and consistency over larger areas and between operators and improved ergonomics of the process. Together these and other advantages may provide a net cost saving.

The methods disclosed herein may involve facilitating adhesion of the additional coating layer or layers to the co-cured film layer present on a substrate comprising applying a reactivation treatment composition comprising at least two solvents, a surface exchange agent, and optionally at least one additive to the co-cured film layer to reactivate the surface of the co-cured film layer to increase adhesion of the surface to an additional coating layer. The combination of the solvents and surface exchange agent may disrupt the surface of the co-cured film layer such that it is activated for adhesion, for example to adhere the additional coating, which may provide effective adhesion for in-service performance, such as the aerospace ASTM intercoat adhesion properties as described herein.

The methods disclosed herein may further comprise one or more optional steps, including at least one of cleaning, wiping and drying the co-cured film layer prior to the application of the reactivation treatment composition to the surface of the co-cured film layer. In certain embodiments, the methods disclosed herein may further comprise a step of cleaning the co-cured film layer prior to the application of the reactivation treatment composition by applying a cleaning solvent to the surface of the co-cured film layer. The cleaning solvent may be any solvent together with any optional desired ingredients to promote cleaning of the surface of the co-cured film layer prior to reactivation. The cleaning solvent may be applied to the co-cured film layer by any means known in the art, including by wiping or spraying the cleaning solvent onto the surface of the co-cured film layer. In certain embodiments, the cleaning solvent may comprise a volatile organic solvent, including, for example, methyl ethyl ketone, toluene, isopropyl alcohol, and methyl isobutyl ketone. Application of a cleaning solvent to the surface of the co-cured film layer may help to ensure that the co-cured film layer is clean and free of any contaminants or debris. Other pre-treatment steps before application of the reactivation treatment composition to the co-cured film layer may also be envisioned. For example, before the reactivation treatment composition is applied, other non-reactivation steps such as mechanical abrasion to remove isolated surface contaminants or washing steps may be performed. It will be appreciated that the pre-treatment steps may be excluded from the methods disclosed herein. For example, in certain embodiments of the methods disclosed herein, the co-cured film layer is not sanded or otherwise mechanically abraded after curing of the film layer and before application of the reactivation composition.

Following the application of the reactivation treatment composition to the surface of the co-cured film layer, the methods disclosed herein may further comprise one or more optional steps including at least one of drying, cleaning, and wiping the surface of the reactivated co-cured film layer. In one aspect, the method comprises drying the reactivated surface of the co-cured film layer prior to application of the additional coating layer or layers. In certain embodiments, the drying step may be for at least about 15 minutes, such as at least about 30 minutes, at least about 45 minutes, at least about 1 hour, at least about 2 hours, at least about 4 hours, at least about 8 hours, at least about 1 day, or for any time interval of any of those durations, for example from about 15 minutes to about 1 day, from about 30 minutes to about 8 hours, or from about 45 minutes to about 4 hours.

In certain embodiments, the additional coating layer may be applied to an average dry film thickness (dft) of at least about 1 mil dft (about 25 microns), such as applied to an average dft ranging from about 1 mil to about 3 mils ft. One or more additional coating layers may be applied in a sufficient thickness to meeting the intended purpose of the additional coating layer(s), such as to restore or enhance gloss of the co-cured film layer. The at least one additional coating layer may be applied so as to have a thickness, for example, of at least about 1 mil, such as a range of from about 2 mils to about 25 mils.

It will be appreciated that one or more steps of the process may be repeated to provide additional coating layer(s) to the previously-coated co-cured film layer and substrate. It will also be appreciated that any further aspects described herein may also apply to the above method.

While the present teachings have been illustrated with respect to one or more exemplary embodiments, alterations and/or modifications can be made to the illustrated examples without departing from the spirit and scope of the claimed embodiments. Further, as used herein, the term "about" indicates that the value listed may be somewhat altered, as long as the alteration does not result in a material change to the illustrated embodiment.

Although the methods of the present disclosure are described in the context of coating on an aircraft, the methods may be implemented for coating on any type of surface, without limitation. In this regard, the surface may be a surface of a motor vehicle including a tractor-trailer, a building, a banner, or any other type of movable or nonmovable structure, object, article, or material having a surface upon which an image is to be placed. The surface may be planar, simply curved, and/or complexly curved.

EXAMPLE

The following Example is being submitted to further define various species of the present disclosure. This Example is intended to be illustrative only and is not intended to limit the scope of the present disclosure. Parts and percentages are by weight unless otherwise indicated.

First, nine samples were prepared, wherein for each sample, a co-cured film layer comprising polyurethane was cured to a composite structure in an autoclave (having a pressure of up to 100 psi and a temperature of up to 121° C., maintained for at least one hour), sanded, and then additional coating layers were painted thereon. The first additional coating layer was a polyamide paint coating, followed by application of a polyurethane basecoat and a polyurethane clearcoat. After the additional coating layers were applied, the composite structure was cured either at room temperature for a minimum of 14 days or at an elevated temperature (ranging between 38° C. and 55° C.) for at least 3 days. Next, the samples were subjected to the whirling arm erosion test as described in Berry D. H. and Seebergh J. E., "Adhesion Test Measurement Comparison for Exterior Decorative Aerospace Coatings: Two Case Studies," Proceedings 26th Annual Adhesion Society Meeting, Myrtle Beach, S.C., pp. 228-230 (2003) and similar to ASTM G-73. After co-curing of the film layer to the composite structure but before sanding, three of the samples were not exposed to ultra-violet (UV) light (see FIG. 3A), three of the samples were exposed to 200 kJ/m² of UV light (see FIG. 3B), and three of the samples were exposed to 1000 kJ/m² of UV light (see FIG. 3C).

Figure 3A:
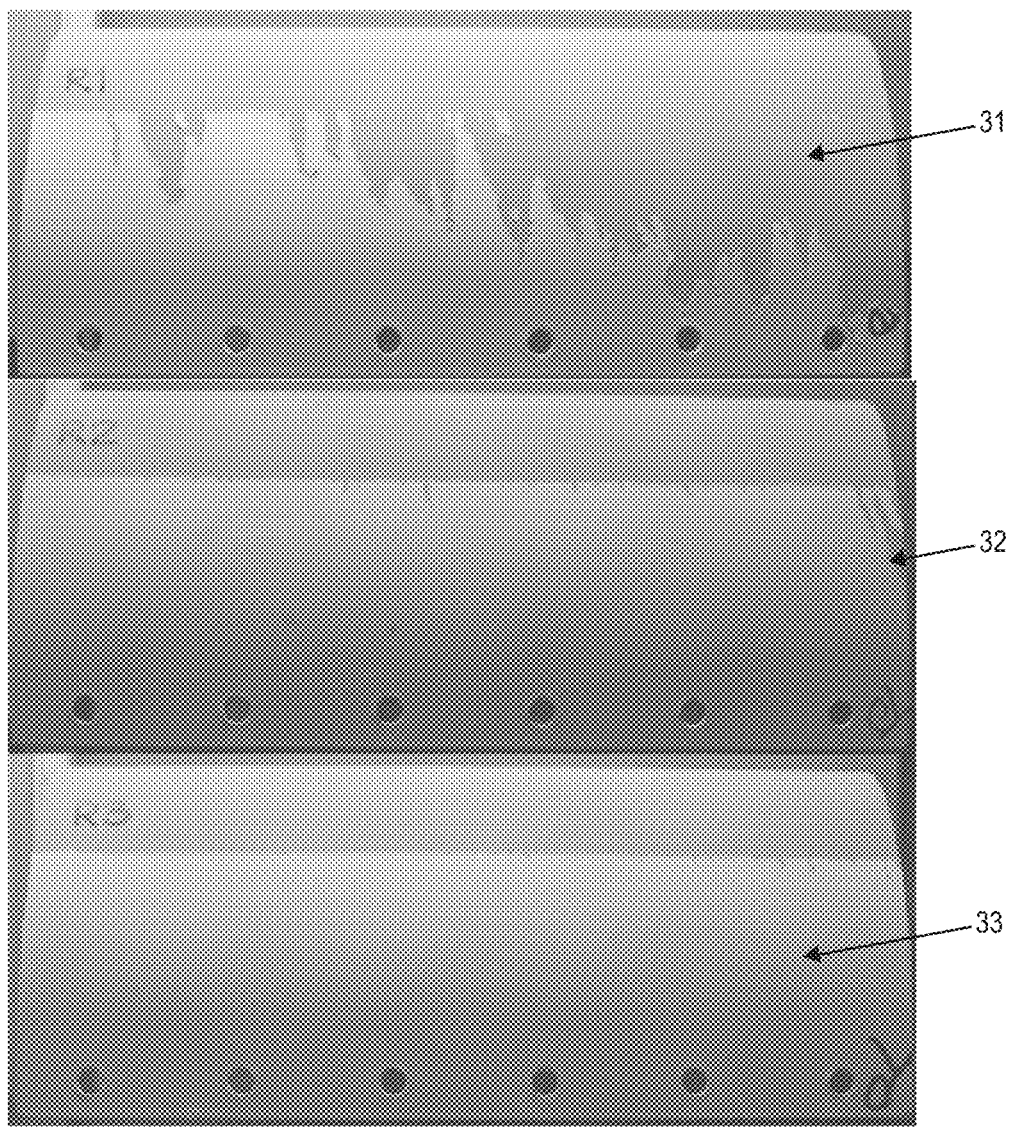
FIG. 3A shows three composite structures comprising a co-cured film layer coated with an additional coating layer and then subjected to rain erosion testing, wherein the co-cured film layer was not exposed to ultra-violet (UV) light and was sanded before application of the additional coating layer.

FIG. 3A shows the three samples wherein the co-cured film layer was reactivated through sanding and not exposed to UV light. As shown in FIG. 3A, at least one of the three samples experienced film layer degradation. For example, the top panel in FIG. 3A shows an intercoat adhesion (31) of about a Level 4 (i.e., about 40% loss of coating or loss beyond 0.75 inches in any location), while the middle panel shows an intercoat adhesion (32) of about a Level 6 and the bottom panel shows an intercoat adhesion (33) of about a Level 9.

Figure 3B:
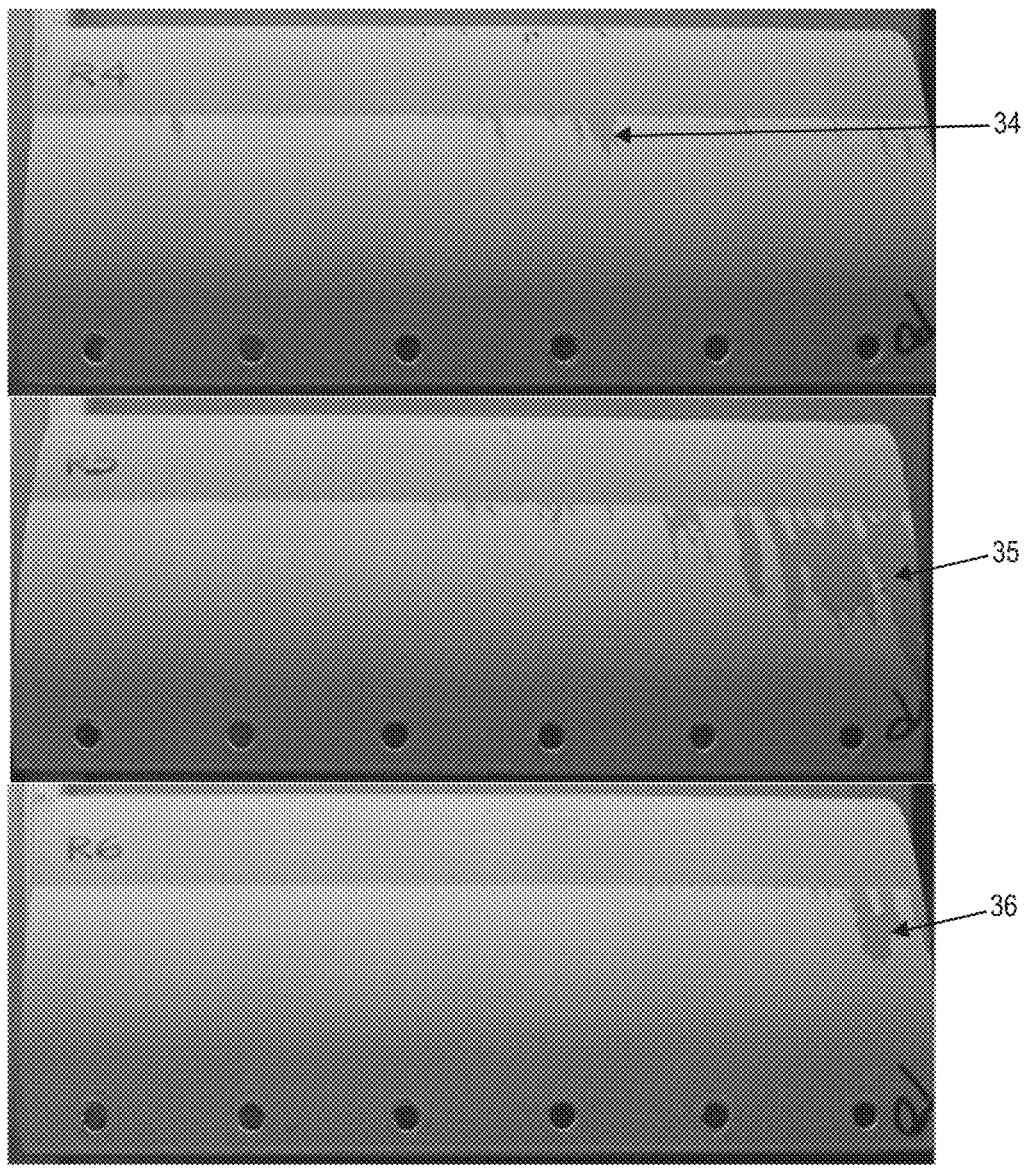
FIG. 3B shows three composite structures comprising a co-cured film layer coated with an additional coating layer and then subjected to rain erosion testing, wherein the co-cured film layer was exposed to 200 kJ/m$^2$ of UV light and sanded before application of the additional coating layer.
Figure 3C:
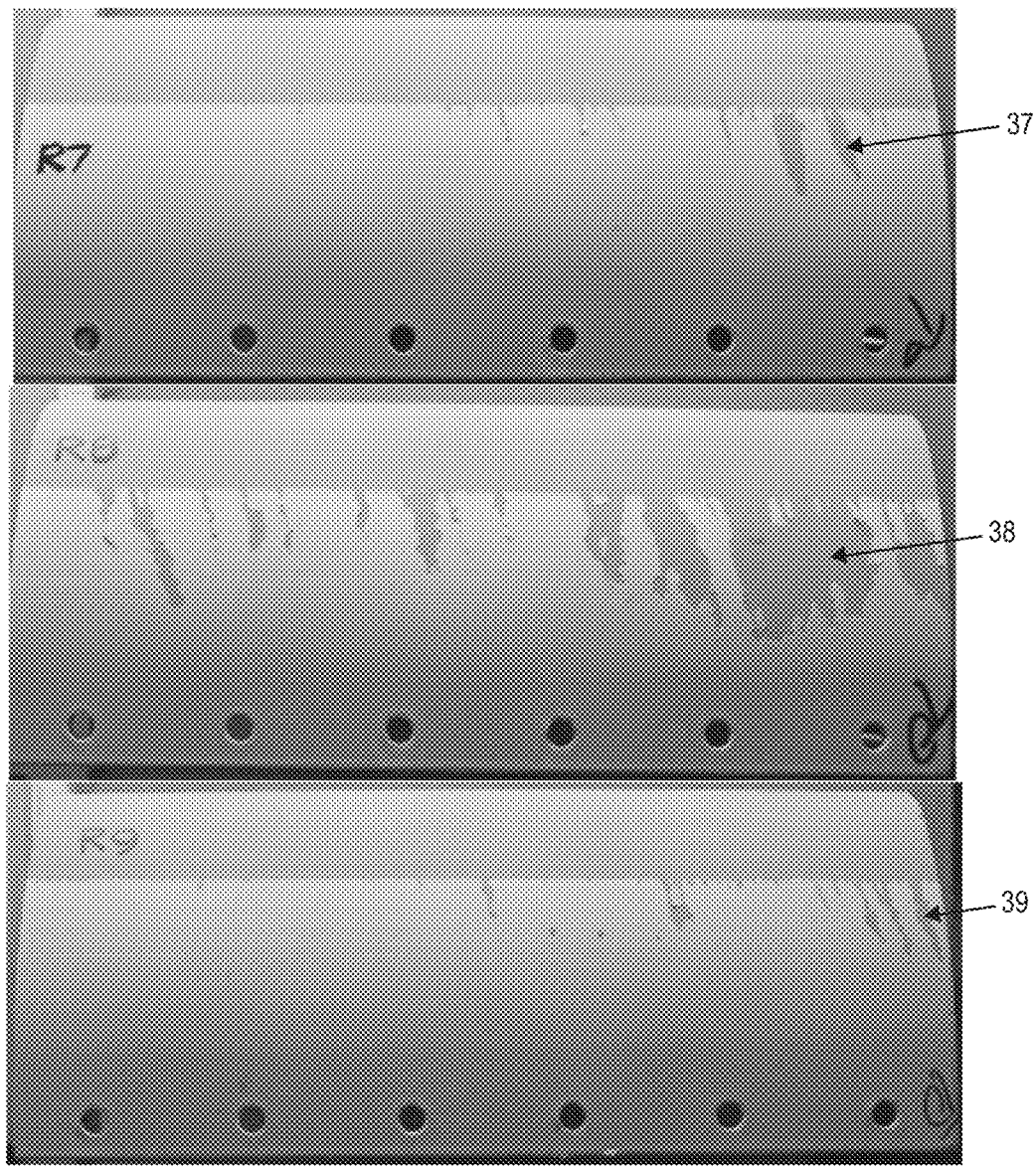
FIG. 3C shows three composite structures comprising a co-cured film layer coated with an additional coating layer and then subjected to rain erosion testing, wherein the co-cured film layer was exposed to 1,000 kJ/m$^2$ of UV light and sanded before application of the additional coating layer.

FIG. 3B shows the three samples wherein the co-cured film layer was reactivated through sanding and exposed to 200 kJ/m² of UV light, and FIG. 3C shows the three samples wherein the co-cured film layer was reactivated through sanding and exposed to 1,000 kJ/m² of UV light. As shown in FIG. 3B, the samples exposed to 200 kJ/m² UV light also experienced coating degradation, as did the samples exposed to 1000 kJ/m² (see FIG. 3C). For example, top panel of FIG. 3B shows an intercoat adhesion (34) of about a Level 7, while the middle panel of FIG. 3B shows an intercoat adhesion (35) of about a Level 4, and the bottom panel of FIG. 3B shows an intercoat adhesion (36) of about a Level 6. Moreover, in FIG. 3C, the top and bottom panels show an intercoat adhesion (37, 39) of about a Level 5, and the middle panel shows an intercoat adhesion (38) of about a Level 4. The degradation of the coating layers indicates that the coating layers painted on the sanded co-cured film layer did not sufficiently adhere to the co-cured film layer.

Next, nine additional samples were prepared, wherein for each sample, a co-cured film layer was cured to a composite structure as described above for the first nine samples (i.e., in an autoclave having a pressure of up to 100 psi and a temperature of up to 121° C., maintained for at least one hour), and wiped with Sur-Prep AP-1 supplied by Zip-Chem. Sur-Prep AP-1 is a reactivation treatment composition comprising tetra-n-propylzirconate in a dipropylene glycol dimethyl ether/n-propanol solvent. Next, additional coating layers were painted thereon. The first additional coating layer was a polyamide paint coating, followed by application of a polyurethane basecoat and a polyurethane clearcoat. After the additional coating layers were applied, the composite structure was cured either at room temperature for a minimum of 14 days or at an elevated temperature (ranging between 38° C. and 55° C.) for at least 3 days. As with the first nine samples, after co-curing of the film layer to the composite structure but before application of Sur-Prep AP-1, three of the samples were not exposed to ultra-violet (UV) light (see FIG. 4A), three of the samples were exposed to 200 kJ/m² of UV light (see FIG. 4B), and three of the samples were exposed to 1000 kJ/m² of UV light (see FIG. 4C). Finally, the samples were subjected to the same whirling arm erosion test (per BSS7393).

Figure 4A:
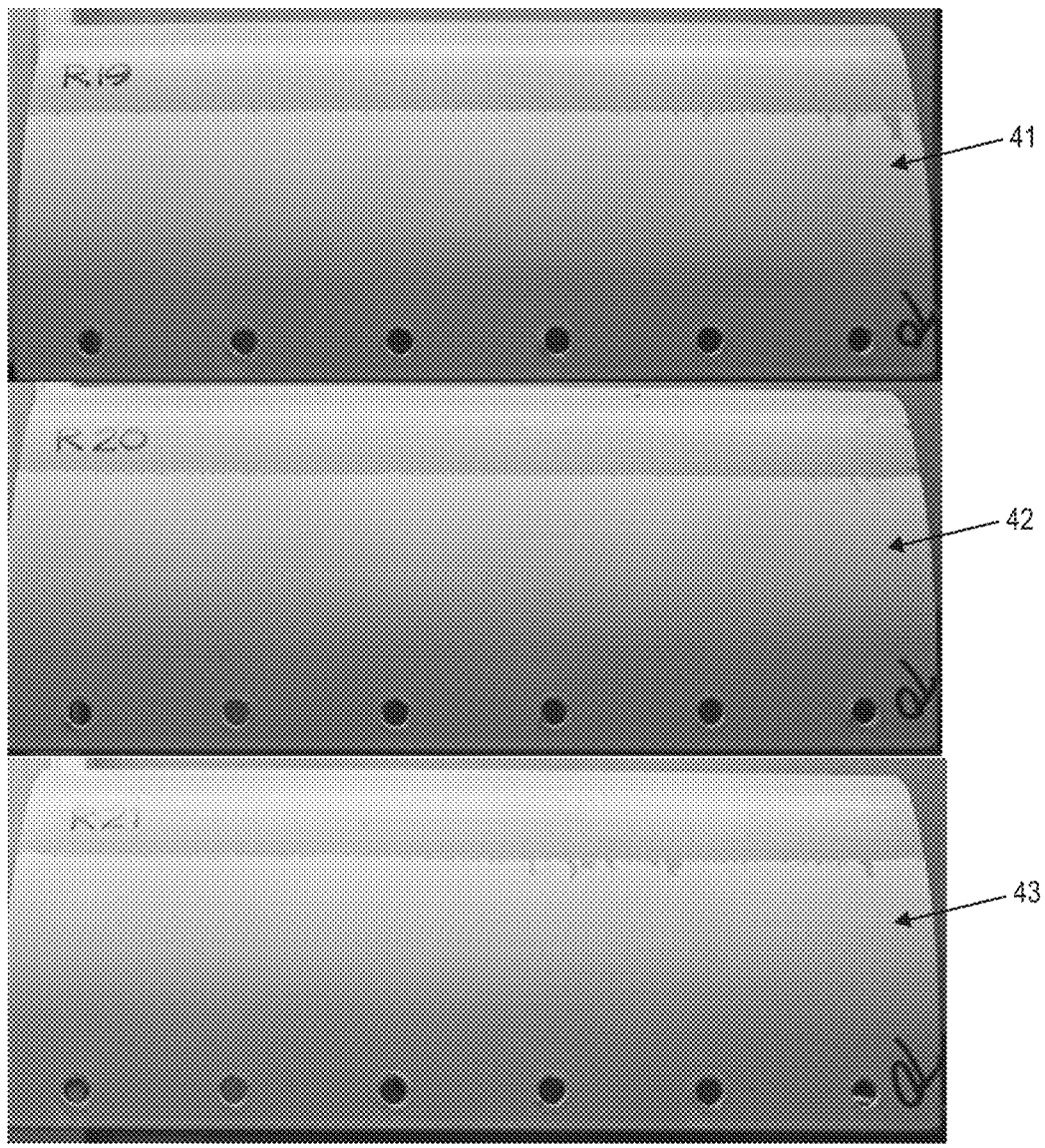
FIG. 4A shows three composite structures comprising a co-cured film layer coated with an additional coating layer and then subjected to rain erosion testing, wherein the co-cured film layer was not sanded nor exposed to UV light, but was treated with a SurPrep® AP-1 reactivation treatment composition before application of the additional coating layer.
Figure 4B:
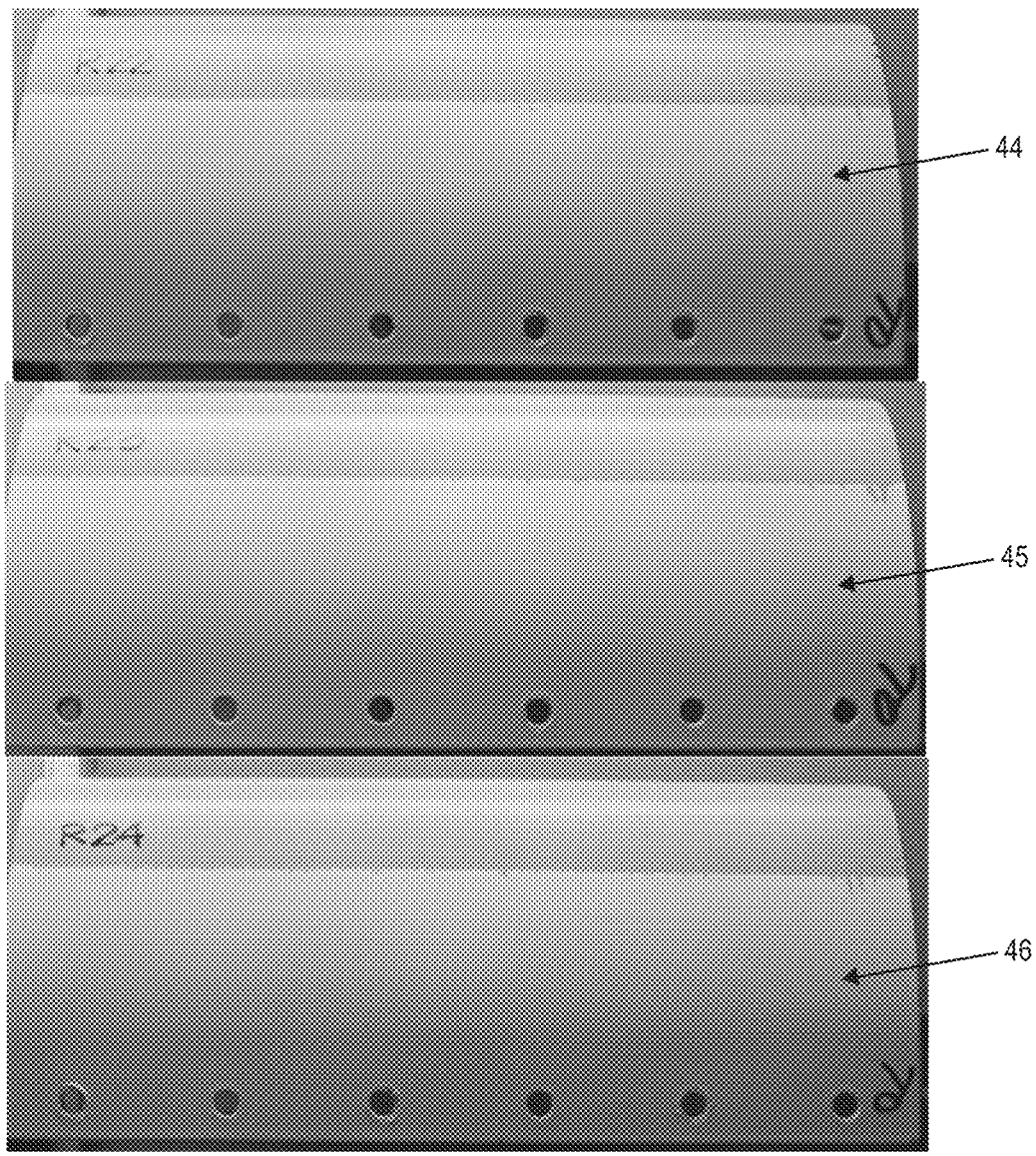
FIG. 4B shows three composite structures comprising a co-cured film layer coated with an additional coating layer and then subjected to rain erosion testing, wherein the co-cured film layer was not sanded, but was exposed to 200 kJ/m$^2$ of UV light and then treated with a Sur-Prep® AP-1 reactivation treatment composition before application of the additional coating layer.
Figure 4C:
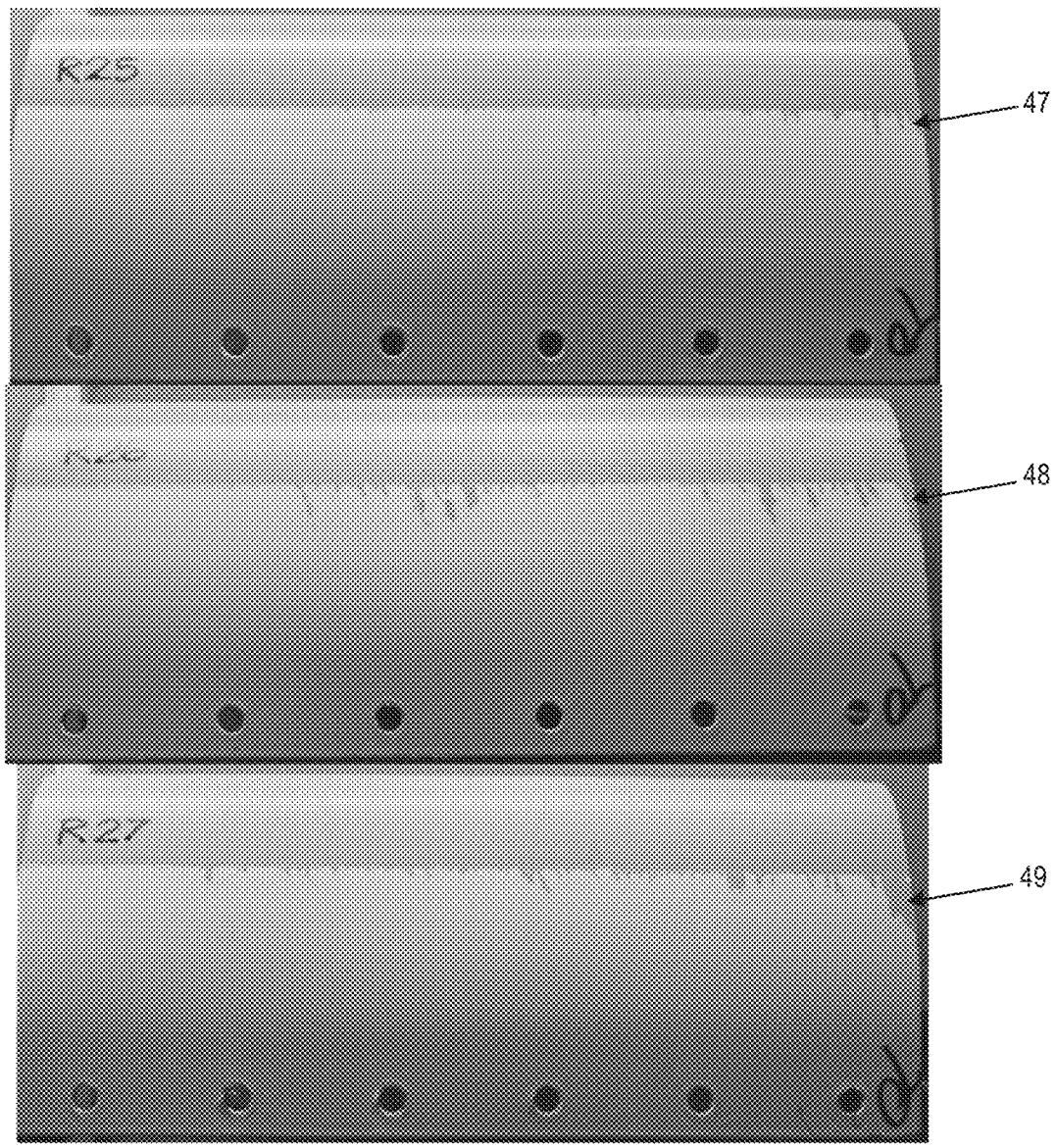
FIG. 4C shows three composite structures comprising a co-cured film layer coated with an additional coating layer and then subjected to rain erosion testing, wherein the co-cured film layer was not sanded, but was exposed to 1,000 kJ/m$^2$ of UV light and then treated with a Sur-Prep® AP-1 reactivation treatment composition before application of the additional coating layer.

As shown in the FIGS. 4A-C, the nine samples all demonstrated little if any coating degradation, as each panel exhibited an intercoat adhesion level ranging from about 6 to about 10. Specifically, in FIG. 4A, wherein the samples were not exposed to UV light, the top panel shows an intercoat adhesion (41) of about a Level 8, while the middle panel shows an intercoat adhesion (42) of about a Level 9, and the bottom panel shows an intercoat adhesion (43) of about a Level 8. In FIG. 4B, wherein the samples were exposed to 200 kJ/m² of UV light, the top panel shows an intercoat adhesion (44) of about a Level 9, while the middle panel shows an intercoat adhesion (45) of about a Level 8, and the bottom panel shows an intercoat adhesion (46) of about a Level 9. Finally, in FIG. 4C, wherein the samples were exposed to 200 kJ/m² of UV light, the top panel shows an intercoat adhesion (47) of about a Level 8, while the middle panel shows an intercoat adhesion (48) of about a Level 7, and the bottom panel shows an intercoat adhesion (49) of about a Level 7. The lack of degradation of the coating layers indicates that the coating layers painted on the co-cured film layers wiped with the reactivation treatment composition exhibited good adherence to the co-cured film layer even after exposing the samples to 200 kJ/m² and exposure to UV light of up to 1,000 kJ/m².

We claim:

1. A method for reactivating a co-cured film layer disposed on a composite structure, the method comprising:
applying a reactivation treatment composition comprising at least two solvents and a surface exchange agent comprising a metal alkoxide or chelate thereof to the co-cured film layer;
allowing the reactivation treatment composition to create a reactivated co-cured film layer; and
applying an additional coating layer to the reactivated co-cured film layer,
wherein the co-cured film layer was previously cured at a curing temperature greater than about 100° C. and wherein the co-cured film layer comprises polyurethane, polyimide, polyester, or epoxy upon curing.

2. The method of claim 1, wherein the curing temperature was at least about 121° C.

3. The method of claim 1, wherein the method does not comprise sanding the co-cured film layer prior to applying the reactivation treatment composition.

4. The method of claim 1, wherein the co-cured film layer was previously cured in an autoclave.

5. The method of claim 1, wherein the co-cured film layer comprises polyurethane upon curing.

6. The method of claim 1, wherein the surface exchange agent is zirconium propoxide.

7. The method of claim 1, wherein the at least two solvents are dipropylene glycol dimethyl ether and n-propanol.

8. The method of claim 1, further comprising applying a cleaning solvent prior to or concurrently with applying the reactivation treatment composition.

9. The method of claim 1, wherein the additional coating layer is a clearcoat.

10. The method of claim 1, wherein the additional coating layer has an intercoat adhesion level ranging from 6 to 10 after whirling arm rain erosion testing.

11. The method of claim 1, wherein the additional coating layer has an intercoat adhesion level ranging from 8 to 10 after whirling arm rain erosion testing.

12. A reactivated co-cured film layer comprising:
a co-cured film layer disposed over a composite structure,
a reactivation treatment composition layer comprising a surface exchange agent comprising a metal alkoxide or chelate thereof disposed over the co-cured film layer to create a reactivated co-cured film layer, and
an additional coating layer disposed over the reactivated co-cured film layer,
wherein the co-cured film layer was cured at a temperature of at least about 100° C. and wherein the co-cured film layer comprises polyurethane, polyimide, polyester, or epoxy upon curing.

13. The reactivated co-cured film layer of claim 12, wherein the co-cured film layer has not been sanded.

14. The reactivated co-cured film layer of claim 12, wherein the additional coating layer has an intercoat adhesion level ranging from 6 to 10 after whirling arm rain erosion testing.

15. The reactivated co-cured film layer of claim 12, wherein the surface exchange agent is zirconium propoxide.

16. An aircraft part having a co-cured film layer thereon comprising:
a composite structure; and
the reactivated co-cured film layer of claim 12 cured to a surface of the composite structure.

17. The reactivated co-cured film layer of claim 12, wherein the additional coating layer has an intercoat adhesion level ranging from 8 to 10 after whirling arm rain erosion testing.

18. The reactivated co-cured film layer of claim 12, wherein the additional coating layer is a clearcoat.

19. The reactivated co-cured film layer of claim 12, wherein the co-cured film layer comprises polyurethane.

20. A method for reactivating a co-cured film layer disposed on a composite structure, the method comprising:
applying a reactivation treatment composition comprising at least two solvents and a surface exchange agent comprising a metal alkoxide or chelate thereof to the co-cured film layer;
allowing the reactivation treatment composition to create a reactivated co-cured film layer; and
applying an additional coating layer to the reactivated co-cured film layer,
wherein the co-cured film layer was previously cured at a curing temperature greater than about 100° C. and wherein the co-cured film layer comprises polyimide, polyester, or epoxy upon curing.

* * * * *